Oct. 27, 1931.  C. F. SPARKS  1,828,881

BAG TURNING APPARATUS

Filed Jan. 21, 1931  5 Sheets-Sheet 1

Oct. 27, 1931.   C. F. SPARKS   1,828,881
BAG TURNING APPARATUS
Filed Jan. 21, 1931   5 Sheets-Sheet 2

Charles F. Sparks,
Inventor.
De la V. Haynes,
Attorney.

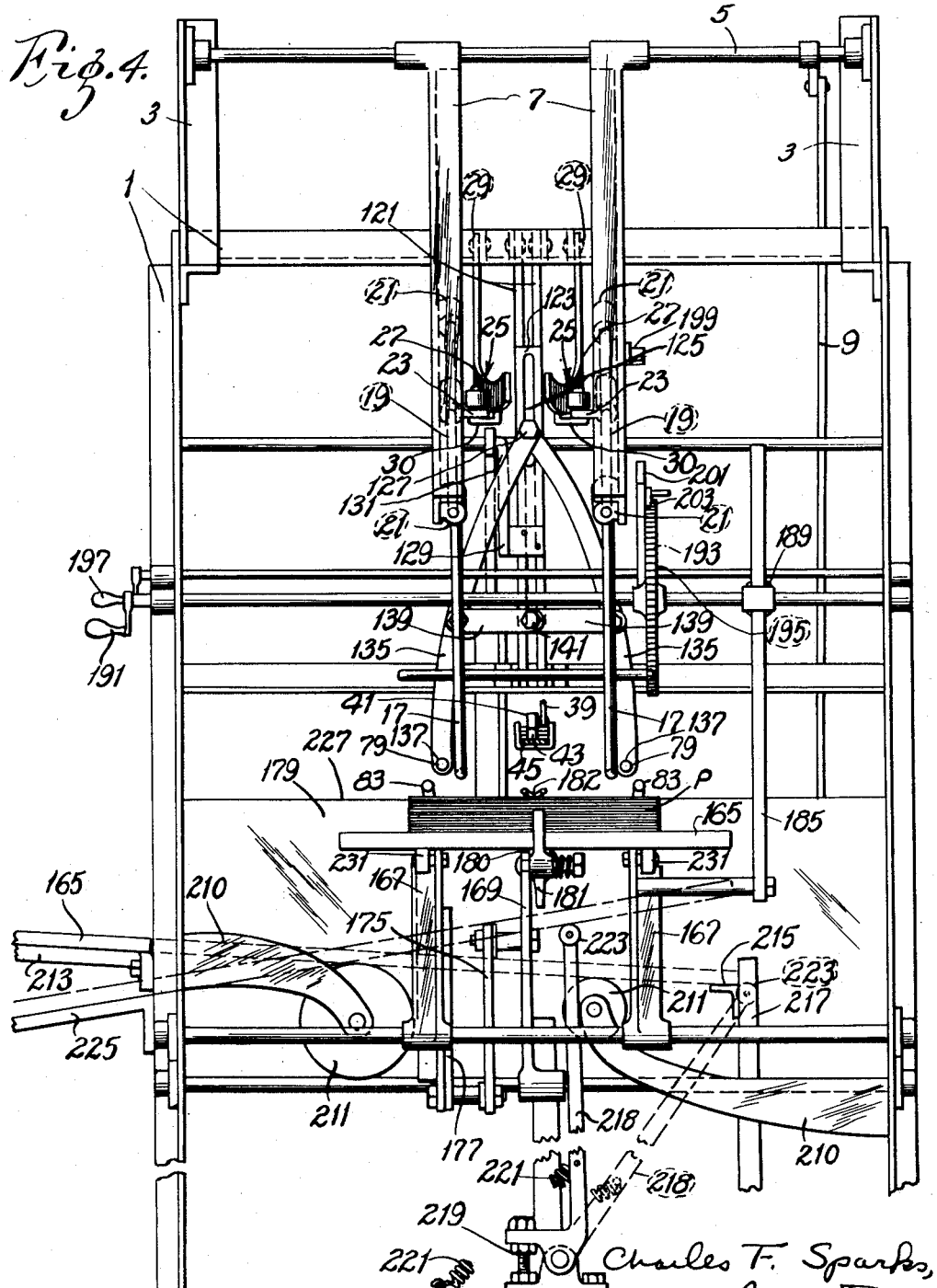

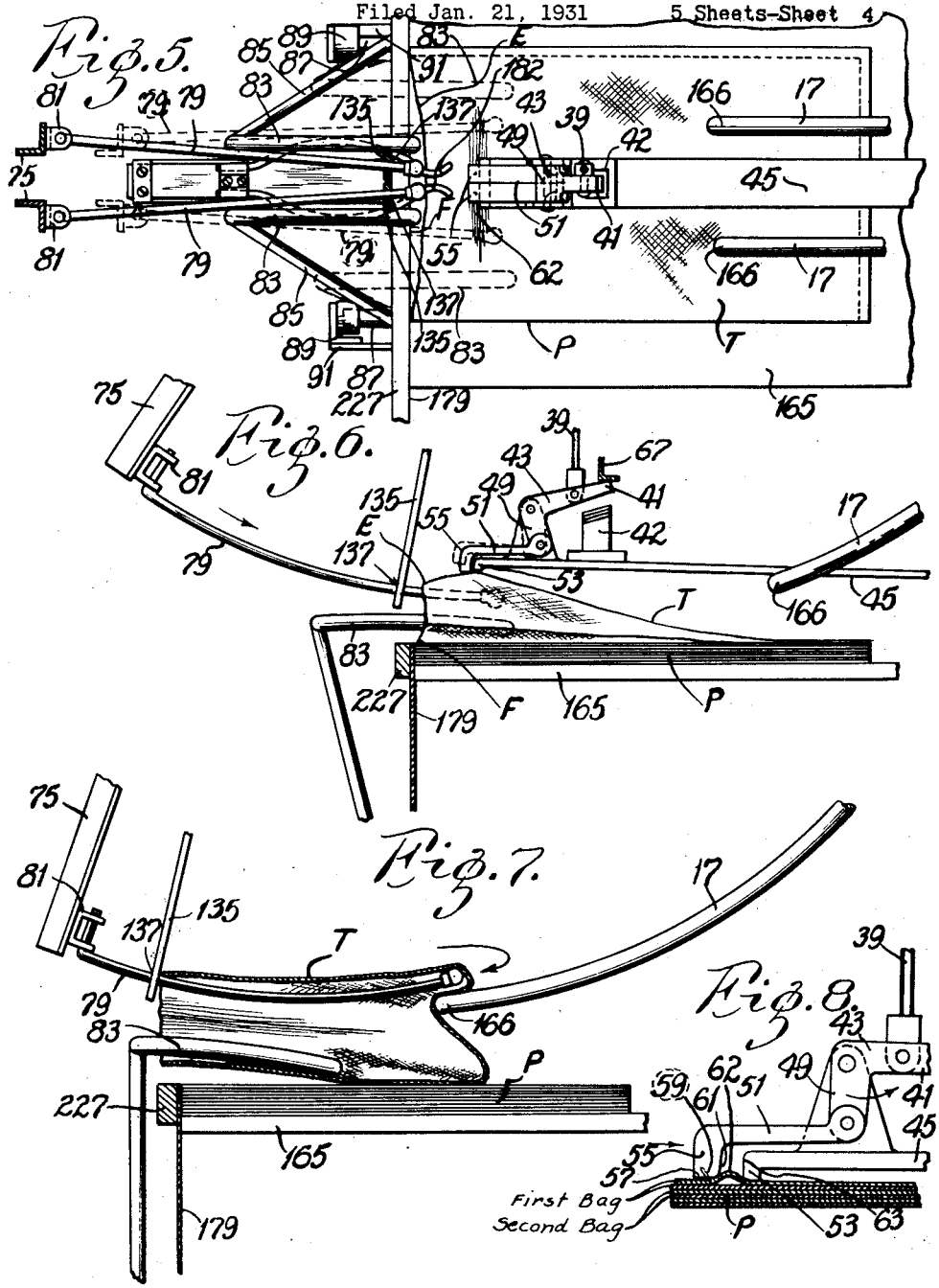

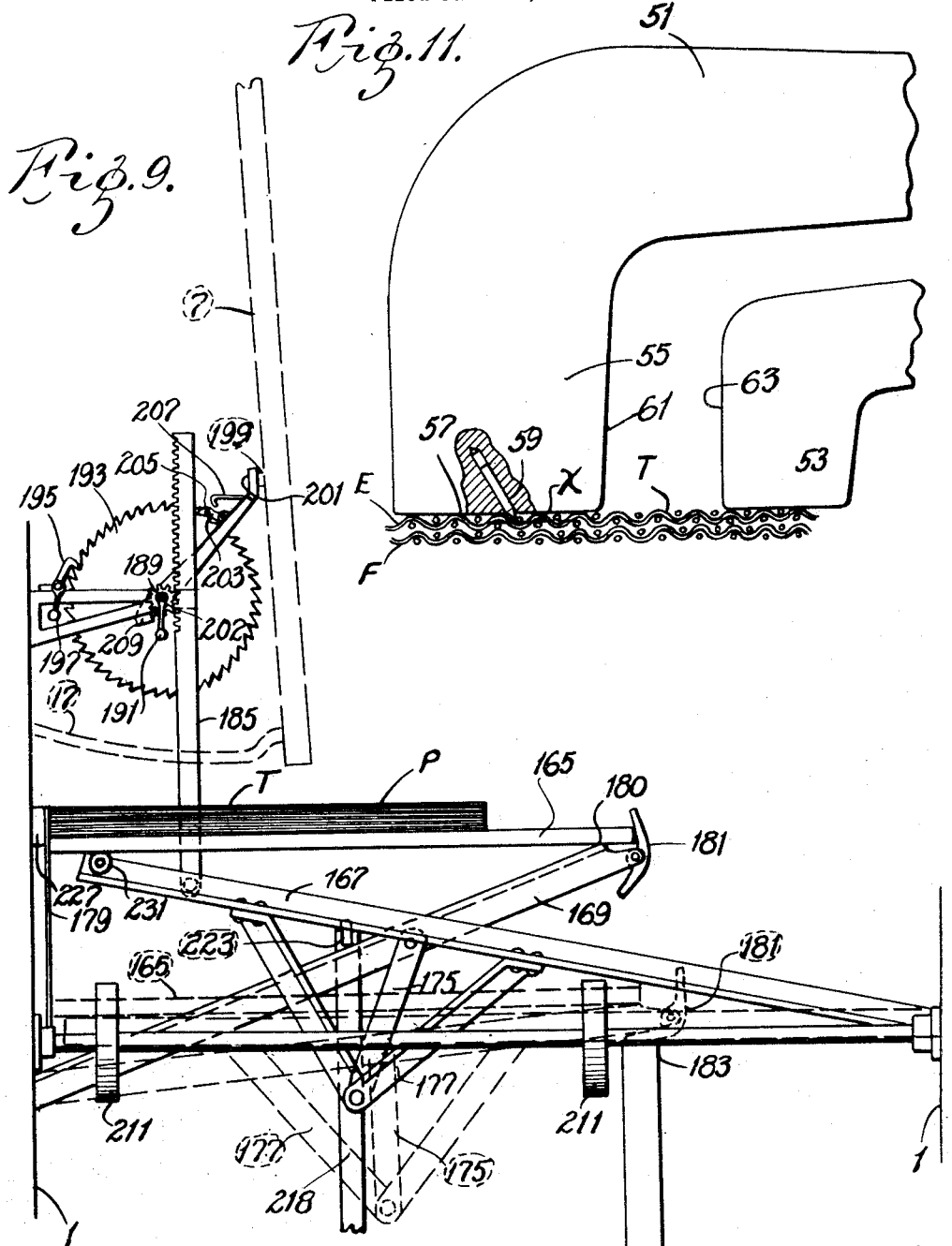

Patented Oct. 27, 1931

1,828,881

UNITED STATES PATENT OFFICE

CHARLES F. SPARKS, OF ST. LOUIS, MISSOURI

BAG TURNING APPARATUS

Application filed January 21, 1931. Serial No. 510,086.

This invention relates to bag turning apparatus, and with regard to certain more specific features, to fully automatic apparatus of this class.

Objects

Among the several objects of the invention may be noted the provision of bag turning apparatus having means for more positively and effectively picking up one side of each bag to effect opening thereof; the provision of apparatus of the class described in which the bags have their mouths opened to a definite position prior to the turning operation; the provision of apparatus of this class wherein the turning operation per se is carried out more positively and to provide a final, more definite position of the bag being turned; and the provision of apparatus of this class which, throughout the entire operation of receiving, turning and delivering of the bags will be fully automatic and positive in its operation. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

Drawings

In the accompanying drawings, in which is illustrated one of various possible embodiments of the invention, Fig. 1 is a side elevation of the machine;

Fig. 4 is a cross section taken on line 4—4 of Fig. 1;

Fig. 5 is a fragmentary plan view of the arrangement for picking up and opening the mouths of bags;

Fig. 6 is a diagrammatic side elevation of Fig. 5 with the parts adavnced;

Fig. 7 is a view similar to Fig. 6 with the parts further advanced;

Fig. 8 is an enlarged side elevational detail of certain pick up fingers in position about to grip the upper layer of a bag;

Fig. 9 is a side elevation showing certain details of an automatic feeding mechanism;

Fig. 11 is a much enlarged detail of a claw or finger of the pick up mechanism.

Similar reference characters indicate corresponding parts throughout the several views of the drawings.

Turning sticks

Figure 1:
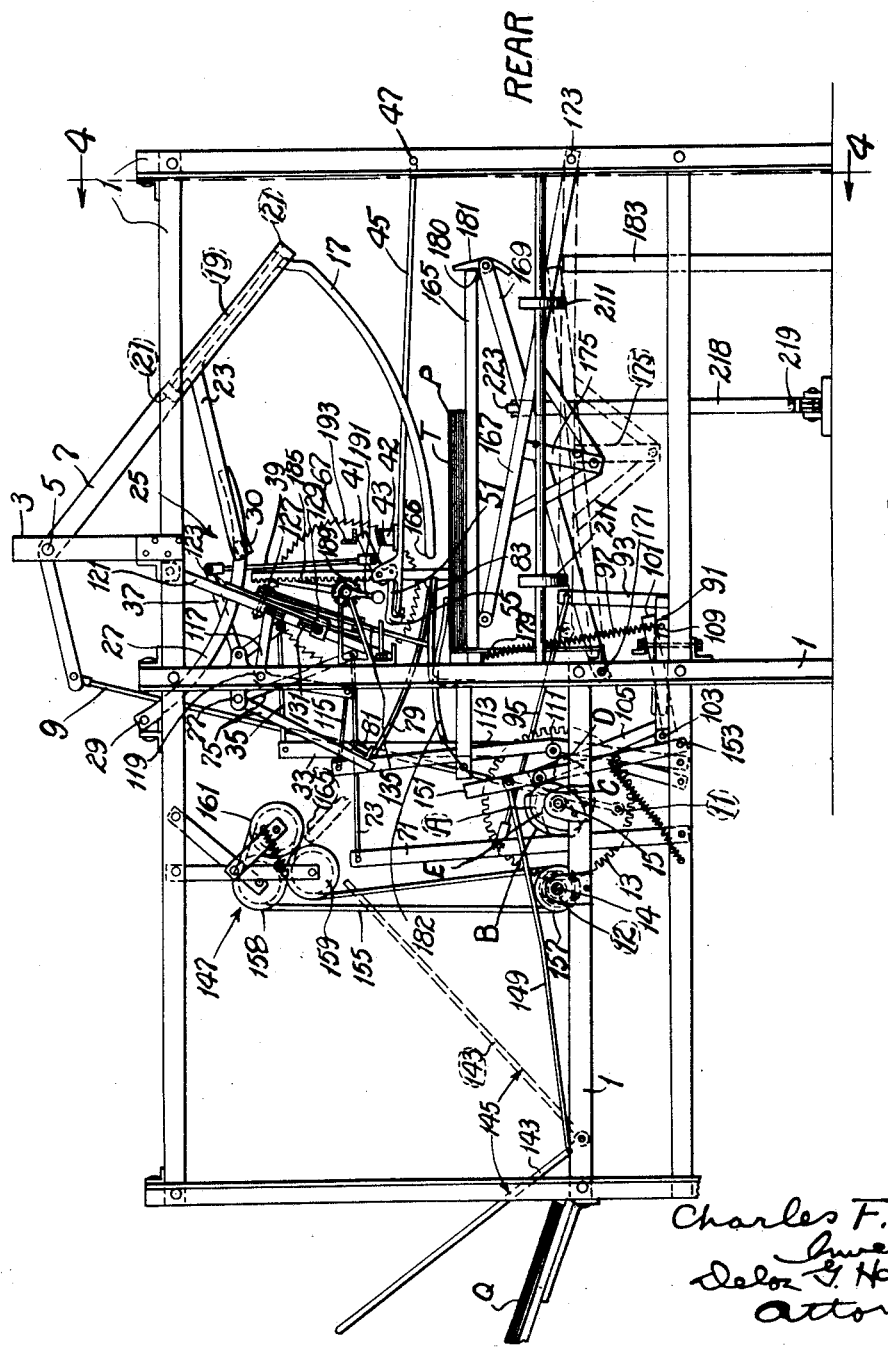

Referring now more particularly to Fig. 1, there is illustrated at numeral 1 a framework having an upper extension 3 which carries a main rock shaft 5 whereby a turning frame 7 is oscillably mounted. This frame 7 is oscillated through a suitable angle by means of a connecting rod 9 reaching from the forward end of the frame 7 to a crank pin 11, the latter being located on a gear 13. The gear 13 is located on a jack shaft 15 borne in said frame 1. The gear 13 is driven by pinion 12 on a shaft 14, the latter being driven by a pulley 16. The pulley 16 is driven from a suitable source of power (not shown). Hence it will be seen that upon rotation of the gear 13, the crank pin 11 causes oscillation of the turning frame 7, this being effected by way of the connecting rod 9.

The turning frame 7 carries laterally swingable turning sticks 17. These sticks 17 are arcuately formed with the rock shaft 5 as a center and form branches from rocking pins 19 supported in bearings 21 in the turning frame 7. Each of the pair of rocking pins 19 also has an upper branch or arm 23 reaching forwardly therefrom in the general direction of the turning sticks 17.

The arms 23 reach forwardly where they are provided with followers 25 engageable with arcuate cams 27 (see also Fig. 4). The cams 27 are fastened to the frame 1 by means of bolts 29 and are readily replaceable by merely unfastening and refastening said bolts 29. The curvature of said cams 27 is about said rock shaft 5 as center. Thus the followers 25 are engageable with the cams 27 and are guided thereby; whence the turning sticks 17 are laterally controlled to spread as said sticks oscillate under action of the swinging of the turning frame 7.

Each of the followers 25 comprises a roller bearing on one side of its respective cams 27 and a hook finger 30 bearing on the other side of said cam, whereby a positive guiding effect is attained.

The detailed shapes of the cams 27 are such as to bring about certain functions of the turning sticks 17 to be referred to hereinafter. Thus the turning sticks 17 oscillate longitudinally of their arcuate lengths and at the same time move laterally, that is to say, spread apart and approach one another as they move arcuately around the rock shaft 5.

Pick up for opening bag mouths

In Fig. 1, the gear 13 is shown as being on the far side of the machine, as therein viewed (to the right of the machine when viewed from the rear). Next to the gear 13 on the shaft 15 (approaching the reader in Fig. 1) is a cam A (Figs. 1 and 3) which engages a follower 31 carried upon a rocking lever 33. A connecting rod 35 links the oscillating arms 33 with a bell crank 37 which is linked by means of a connecting rod 39 to a tail piece 41 of a bell crank 43 attached to a pick up arm 45, the latter being oscillably attached to the frame 1 at its rear end (see numeral 447). As shown, the bell crank 43 is oscillatingly pivoted on the pick up arm 45. On its downwardly extending arm 49, said bell crank 43 has pivoted fingers on claws 51 which reach forwardly along the length of the pick up arm 45 upon which said fingers 51 also rest. Beyond the end portion 53 of said arm 45 (see Figs. 8 and 9) each finger 51 is formed downwardly into an L-shape 55. The length of the L-shaped extension 55 is somewhat greater than the depth of the forward face 63 of the pick up arms 45 so that when said arm 45 is depressed, upon a stack of bags P, said claw 51 will rest of its own weight upon the uppermost layer of fabric of the stack of bags. It will be clear that the weight of the fingers 51 may be carefully adjusted, because each is a separate and small piece and substantially independent of the remainder of the mechanism, so far as design is concerned. The advantage of this will be made clear hereinafter.

Figs. 8 and 11 show details of the pick up linkage and of the character of the downwardly projecting end 55 of the fingers 51. In Fig. 11 is shown the character of the lower surface of the L-shaped projection 55 of one of the fingers 51. The lower surface 57 has projecting therefrom a needle point 59. This point slopes rearwardly and in the direction that the finger moves in wrinkling a layer of cloth. The projected distance from the end to the point of the needle 59 to the surface 57 (see distance X) is less than the thickness of one layer of cloth, as shown in Fig. 11. The finger 51 has a rearward clamping face 61 which, with the forward clamping face 63 of the downward projection 53 of the pick up arm 45, forms pinchers for gripping therebetween a wave or wrinkle or unfolding of cloth caused by rearward movement of the fingers 51 and the catching action of the points 59 (Fig. 8). It is to be understood that a single point 59 is to be used with each claw 51 and that the invention will operate where only one claw 51 is used. However, in the present embodiment two claws 51 are shown (see Fig. 5). The operation of the pick up device will be clear from the above and in view of the following description of operation:

As the cam A rotates, it operates upon the roller 31 to oscillate the lever 33. The lever 33, by means of linkages 35, 37, 39 and 43 causes the pick up arm 45 to oscillate up and down. This oscillation takes place to and from a stack of bags such as shown at P. The operation starts with the pick up arm 45 lying on the topmost layer of cloth of the stack T. This means that the fingers 51 are also lying loosely on the topmost layer as shown in Figs. 8 and 11. Each needle point 59 pricks the upper layer of cloth but does not pass therethrough, that is to say, does not extend into the second layer of cloth forming the opposite side of the uppermost bag in a stack P.

Next, the link 39 is lifted. This rocks the bell crank 43 counterclockwise to draw the fingers 51 forwardly. The needle points 59 in catching or pricking the upper layer of cloth force a wrinkle 62 ahead of the face 61 of the claw 51 and in between said face 61 and the forward face 63 of the arm 45. This action continues until the wrinkle 62 is caught between said faces 61 and 63 and definitely pinched into position. This does not involve a second layer of cloth, the upper layer sliding on the second layer. Thus is the motion of the bell crank 43 limited and after it has stopped its movement (due to pressure by the faces 61, 63 on the wrinkle 62) the connecting rod 39 lifts the bell crank 43 and the connected arm 45 until an upper stop 67 is engaged. Further upward movement of the connecting rod 39 then results in rotation of the bell crank 43 around its instantaneous point of contact with the stop 67, thus causing return movement of the claw 51 with respect to the arms 45. This releases the upper layer of cloth which has now been picked up (see Fig. 6).

An adjustably shimmed stop 42 limits clockwise movement of the bell crank 43 with respect to the arm 45, so that upon the arm 45 resting on the stack P, the opening of the puncher gap will be definitely limited. This feature, taken in connection with those above noted, such as the freedom of swing of the fingers 51 on the bell crank and the needles 59, results in a positive pick up of only the upper layer of material of the uppermost bag on the stack P.

Upper holding arms

The next device to be considered on the jack shaft 15 is a cam B. This cam B controls the follower 69 on an oscillating lever 71, the latter being connected by means of a connecting rod 73 with a bell crank 75 pivoted to the frame 1 at 77. The arm of the bell crank 75, not connected with the connecting rod 73, carries an upper set of holding arms 79 loosely pivoted in bearings 81 on the bell crank 75 for lateral movement, not unlike the movement obtaining for the turning sticks 17. The arms 79 are arcuate but not with the center of swing 77 at the center of the arc, for purposes to be set forth. Rotation of the cam B causes oscillation of the lever 71 and consequently oscillates of the bell crank 75 with resulting forward and backward oscillating movement of the upper holding arms 79. The method of laterally controlling these arms will be described later.

Lower holding arms

The oscillating lever 71 is also responsible for coordinated forward movement of a lower set of holding arms 83. The arms 83 have downward extensions 85 formed as branches on holding shafts 87. The shafts 87 are oscillatory and are held in bearings 89 in a frame 91, said frame 91 being pivoted to the main frame 1 at 109. The frame 91 is provided with an upward extension 93 which is connected with the oscillating lever 71 by means of a connecting rod 95. Thus forward movement of the lever 71 causes a forward swinging motion of both the upper and lower holding arms 79 and 83.

By means of the shaft portions 87 in the bearings 89, the lower holding arms 83 may rock laterally. Normally, they are held in separated position by means of tension springs 97 (see dotted lines in Fig. 10). In order to permit separation of the lower arms 83 at the proper time, there are provided fingers 99 that extend inwardly towards one another and centrally engage a bell crank 101, the latter being pivoted at 103 to the frame 1. This bell crank 101 has an arm 105 carrying a follower 107 which engages with a cam C on the jack shaft 15, to be moved thereby.

Figures 3, 10:
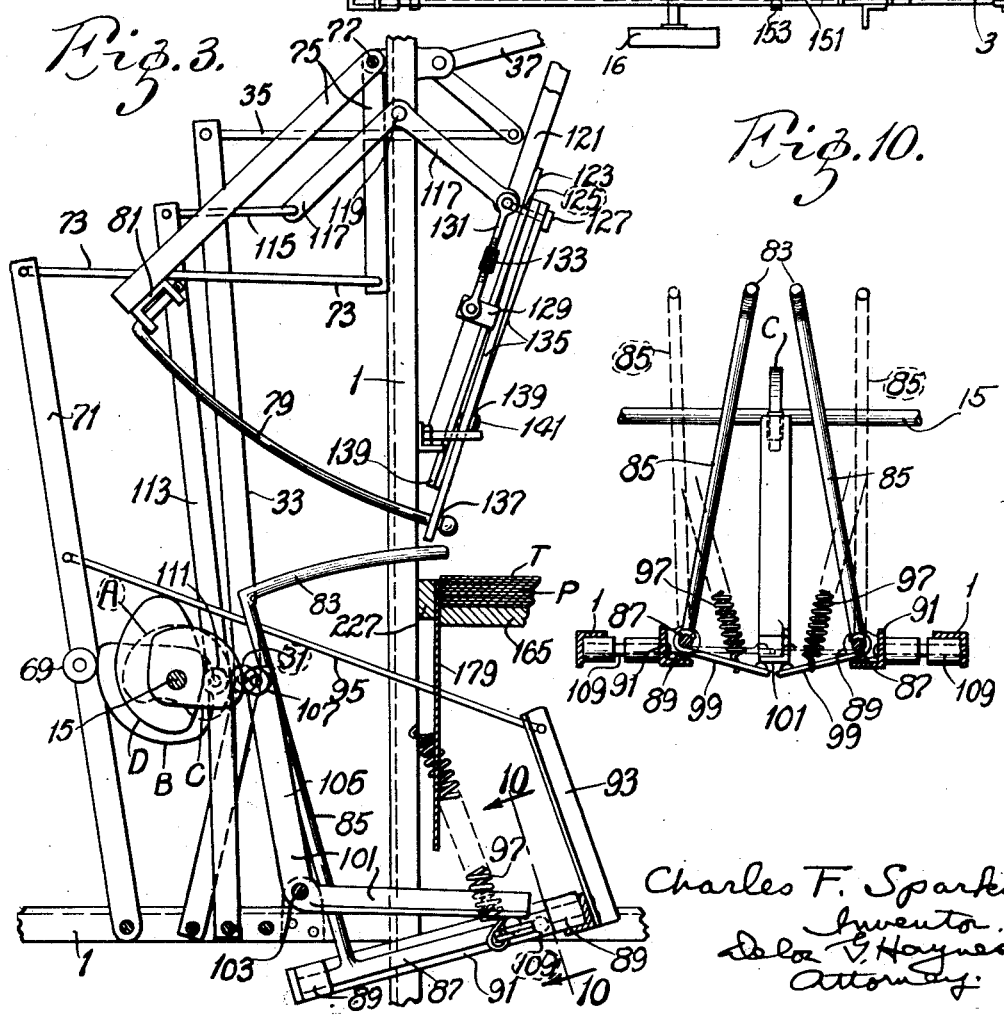
Fig. 3 is an enlarged, fragmentary side elevation showing the positioning of certain of the mechanism prior to opening the mouths of bags.
Fig. 10 is a cross section taken on line 10—10 of Fig. 3.

The operation is such that when the lower holding arms 83 are in retracted position, as shown in Fig. 3, then the cam C positions the bell crank 101 to engage the ends of the fingers 99. This causes the lower holding arms 83 to approach one another, laterally considered. As the arms 83 proceed forwardly under control of the cam B, they separate, the bell crank 101 permitting this by rotating counterclockwise under the controlling action of cam C.

It will be noted that the springs 97 are also responsible for the linkage associated with lever 71 being set so that the respective followers 69 and 107 engage their cams.

The exact subsequent movements of the respective sticks 17 and arms 79 and 83 will be referred to hereinafter in the description of operation. What is here sought to be clarified is the broad mode of operation. It has been shown that the lower holding arms 83 oscillate forwardly and rearwardly along their lengths and also approach one another and separate according to the requirement of the control cams B and C and that cam B also controls the forward and rearward movement of the upper holding sticks 79.

Separation of upper holding arms

The control for separating the upper holding arms 79 takes place from a cam D operative upon a follower 111 (Fig. 3). The follower 111 is mounted on an arm 113 which, by means of a connecting rod 115, oscillates a bell crank 117. The bell crank 117 is pivoted to the frame 1 at 119.

As shown more particularly in Figs. 3 and 4, there is attached to the frame 1 a sloping guide 121 which carries a slider 123 having a slot 125 engageable with a pin 127 on the guide 121, for guiding purposes. An extension 129 from the slider 123 is articulated with the bell crank 117 by means of a connecting rod 131, including an adjustable turn buckle 133 for adjusting the relative elevation of the slider 123 in the guide 121.

The guiding pin 127 also oscillably supports in scissors fashion a set of control arms 135 having openings 137 at their ends for accommodating slidably the upper holding arms 79. The control arms 135 are controlled to approach one another and separate by means of a pair of toggle links 139 pivoted together and to said slider 123 (see numeral 141). Hence it will be seen that a lifting action of the slider 123 by the connecting rod 131 results in pulling up the center portions of the toggle lings 139, thereby separating the control arms 135 and thus separating the holding sticks 79. The toggle arms 139 are adjusted so as to slightly over center in their upward positions so that the sticks 79 are positively held in their open or separated position. Return movement is effected merely by the descent of the slider 123 when permitted by the oscillating arm 113 under control of the cam D.

Ejection of bags

In order that turned bags may be ejected from the machine, there is provided at the front end a set of fly arms 143 adapted to swing through the angle 145 shown in Fig. 1 and beneath a triple set of rolls 147. The fly arms 143 are operated by means of a connecting rod 149 from a rocking lever 151, the latter being operated from a cam E on said shaft 15 and pivoted to the frame 1 at 153. The triple set of rolls 147 is driven in the directions shown by means of a belt 155 from a pulley 157 on the shaft 14 carrying the driving pinion 12 for the gear 13. One of the rolls, namely roll 158 is solid and serves to feed bags out of the machine. The other rolls 159 and 161 are in segments (see Fig. 2), having recesses 163 for accommodating the ends 166 of the turning sticks 17 when said sticks 17 are in their forward position with a turned bag thereover (see dotted lines Fig. 1). Thus the sticks 17 with their turned bags upon them deliver the bags into the rolls 159, 161, said rolls substantially engaging. The bag travels out between the rolls 158 and 159 and down in front of the fly leaves or sticks 143 in their rearward positions. The leaves 143 are timed to then move forwardly and deliver the bags to a second stack Q on a platen at the forward end of the machine, from whence they are taken in turned condition.

Stack adjustment

It is desirable that the stack of the bags P have the uppermost bag thereof maintained substantially at a constant level as turning of successive bags proceeds and as the stack is being decreased. In order to accomplish this end, the stack P is formed upon a table board 165. The table board 165 is supported at the ends of crossed frames 167 and 169 each pivoted to the frame 1 at numerals 171 and 173 respectively. The crossed frames 167 and 169 are arranged as a parallelogram linkage by interconnecting them according to the laws of this linkage with links 175 and 177 so that the elevations of the ends of the frames 167 and 169 are substantially the same regardless of their respective distances apart. The front of the board 165 abuts a partition 179 and the rear is held in place by a spring clip 181 which is released in the depressed position of the board 165 by coming into contact with a stop 183 (see dotted line position of the linkage including the frame 167, 169, as shown in Fig. 9). It will be understood that by parallelogram linkage or motion is included one that is substantially so, that is, one wherein the table board 165 lifts into various positions substantially parallel to themselves.

In order to gradually lift the table board 165 as turning proceeds, there is pivoted to the frame 167 a rack 185 meshed with a pinion 189. The pinion 189 may be turned by means of a hand crank 191 and/or by means of a ratchet wheel 193. A locking pawl 195, releasable by a handle 197, functions to prevent reversal of the ratchet 193 when it is not being driven forward (counterclockwise). The ratchet 193 is driven forwardly and intermittently by means of a lug 199 mounted on the turning frame 7. The lug 199 strikes a dog 201 rotatable on the shaft 202, which shaft also carries the ratchet 193 as well as the pinion 189 and crank 191. The dog 201 carries a pawl 203 which moves the ratchet 193 ahead a predetermined amount upon each contact of the lug 199 with the dog 201. The amount of advance is preferably one tooth, and a one tooth advance is adapted to raise the table 165 substantially the thickness of one bag.

The purpose of the crank 191 and release lever 197 is to permit of manual adjustment when loading and unloading; and in order to facilitate this, a pin 205 is placed on the pawl 203, adapted to be caught by a manually rotatable hook 207 for holding up the pawl 203 when adjustments are being made. It will be seen that a stop 209 holds the dog 201 in place and prevents it from rotating clockwise any farther than shown in Fig. 9. Its counterclockwise movement is substantially through the angle subtended by one tooth on the ratchet 193.

In Fig. 4 is shown how the table 165 is handled when it is desired to reload it. Brackets 210 carry rollers 211 which are sloped inwardly with respect to each other and with respect to the frame of the machine so that a board 165 placed on a receiving slide 213 may be slid in on the rollers 211 into position on and against a bracket 215 carried on a support 217. The ends of the frames 167 and 169 are at this time below the elevations of the upper tangent points of the rollers 211. Hence when the crank 191 is turned and the rack 185 lifted, the ends of said frames 167 and 169 will engage the now loaded board 165.

About five hundred bags having been loaded on the board, the table is lifted to the proper positions for effecting the operations to be described hereinafter and then the pawl 203 is released from the catch 207 and thus dropped into place between the teeth on the ratchet 193 ready for operation when the machine is started. After this, the raising of the board 165 is automatic, the board raising substantially the thickness of one bag for every cycle of operation gone through by the machine, that is, for each turning of a preceding bag.

After the board 165 has been substantially emptied of bags it may be again depressed by latching up the pawl 203 and dropping the rack 185 by operation of the crank 191, the holding pawl 195 having also been lifted by operation of the lever 197.

Below the board 165 there is oscillably supported a bracket 218 having an adjustable stop 219 and a spring 221 for holding the same in vertical position such as shown by solid lines in Fig. 4. At the end of the bracket 217 is a roller 223. When the board 165 descends, it strikes the roller 223 and the board slopes to the left, engaging roller 211 and from thence rolls out of the machine on to a receiving platen 225. It will be seen that when the board 165 with its fresh load of bags to be turned comes into the machine from the platen 213 and rides over the roller 211, that it engages the spring held bracket 217 and pushes it aside to the dotted line position shown in Fig. 4. As the board 165 is automatically and/or manually raised, the spring held bracket 217 follows it into vertical position so that when the empty board again comes down, the ejecting action on the board above described takes place.

At the upper end of the frame 167 is a roller 231 which prevents any substantial tendency of the rearward component of movement of the frame 167 from pushing the board 165 from the guide 179. On the other hand, the end 180 of the frame 169 contacts directly and frictionally with the board 165 so that the forward component of motion of said frame 169 will help the clip 181 force the board against said guide 179.

At numeral 182 in Fig. 1 is shown a set of flexible leaf spring clip devices which is useful in keeping the edges of the uppermost bag of the stack in smooth condition. The use of this device is, however, optional. It has not been shown in Fig. 3.

Operation in general

The operation of the machine is as follows:
About five hundred bags are placed on the table board 165 which is then resting on the delivering platen 213 (Fig. 4). The table board raising mechanism, including the frames 167 and 169, has previously been lowered. The lowering of the table 165 has been accomplished manually.

The table board 165 and its load of bags are then pushed inwardly until the table board pushes aside the bracket 218 and rests on the roller 211. It then rolls in further into the machine and rests against the brackets 215, 217.

To properly position the table board 165, the table supporting mechanism is raised so that the topmost bag of the stack P is just above the crossbar 227 at the upper edge of the guide plate 179. It may be again noted that the table board 165 is held against the guide 179. The manual raising of the table 165 is at this time accomplished by turning the crank 191. After the machine is started, the action of the lifting of the table 165 is automatic. This is because of the cooperation between the lug 199 and the dog 201 as the turning frame 7 oscillates. Thus each succeeding bag is in a position corresponding to that of the preceding one and the pick-up means is thus operable at about the same elevation at all times. The designed constants of operation are not varied. With the bags in position, the operation of the turning sticks will now be described:

Started with the machine in the position shown in Fig. 1, the sticks 17 and arms 79, 83 are separating, the former going rearward and the latter forward. After further movement, the upper and lower holding arms 79 and 83 respectively are positioned forwardly as far as they will go (see Fig. 3). All of the holding arms are close to one another laterally considered (see full lines of the lower holding sticks 83. Fig. 10; downward positioning of the slider 123 Fig. 3; and consider that the follower 25 in Fig. 1 is at the outer ends of the cams 27). The pick-up arm 45 is raised.

The cycle of operation starts by the pick-up arm 45 descending to the top surface of the top bag of the stack P, this being done conjunctively with the fingers 51. It will be seen that as the pick-up lever 45 descends, the outer ends 55 of the fingers 51 will move to the left and then rest lightly upon the upper layer of cloth with a normal force which is independent of the force pressing the lever 45 to the stack. The degree of opening movement of the fingers 51 is definitely determined by the stop 42 and this is adjustable from time to time. The needle 59 will start to pierce or penetrate the upper layer of cloth when it comes to rest but will not pass through it, because the distance X is less than the thickness of one layer of cloth. The needle 59 does not drag the cloth because it slopes in the opposite direction.

As the link 39 lifts under continued action, the bell crank 43 is rotated counterclockwise (Fig. 8). This draws the fingers 51 to the right, the needle 59 in each finger 51 slightly pricking the cloth and forcing the upper layer thereof in a right hand direction to form the wrinkle 65 between the faces 61 and 63. Finally, the wrinkle is completely gripped between said faces 61 and 63 but the second layer of cloth is left intact. When the reaction due to gripping the wrinkle 65 is complete, the pick-up lever 45 begins to move under the lifting action of the now bound bell crank 43 and link 39. This lifts the upper layer of the first bag and that layer only and provides a positive means for grasping said upper layer.

It will be seen from Figs. 5 and 6 that, although the upper edge E of the bag may be irregularly formed, that is, form a cuff, the lower edge F, not having been moved, retains its original straight line position.

The next movement is for the holding arms 79 and 83 (now positioned relatively close to one another) to enter the now open mouth of the bag. The lower holding arms 83 maintain a position close to the lower layer of the bag, that is, near the upper face of the stack P. Then the lower arms 83 spread apart as the shapes of the cams B and C of Fig. 3 indicate (see also Fig. 7). Inasmuch as the arms 83 are near the lower layer of the bag being turned, they spread out along the straight edge F and insure that there will be no fold or cuff when the corners of the bag are reached by the respective arms 83. Inasmuch as the arms are spring spread, the edge of the bag stops them. Thus when the fingers 51 release the upper layer of the bag, that is, when the tail piece 41 strikes the stop 67, the mouth of the bag will be positively stretched without a cuff or irregularity in the upper edge. Any irregularity in the upper edge E caused by the pick-up action of the finger 51 will be straightened out by this procedure.

As the arms 83 enter the lower portion of the bag, the arms 79 enter the upper portion thereof as shown in Figs. 6 and 7. The upper holding arms 79 also are separated after they enter the bag by the mechanism as illustrated in Fig. 3. Their eccentricity with respect to the center 77 results in the upper edge of the bag being drawn up and having its mouth held open as a quadrilateral figure.

The finger 51 having released the bag after proper entry and spreading of the arms 79 and 83, the bag is stretched open on the now separated arms. Next, the turning stick 17 pushes the bottom or base of the bag through the mouth as shown in Fig. 7. The then relative positions of the turning arms and holding sticks are shown in Fig. 4. The bag is then slipped over the holding arms, turned inside out and positioned on the turning sticks 17 as said sticks proceed. In slipping the bag over the holding arms, said holding arms slightly approach one another as the slipping action takes place, thus easily releasing the bag. This is due to the fact that the springs 97 are all that are holding the arms 83 laterally within the bag and hence the tension of the bag is caused by said springs. Therefore when the tension of the bag is increased, as in turning it, the spring-held arms 83 give, the effect being enhanced by a slight relieving action on the bell crank 101 by the cam C. At the same time the turning sticks 17 spread. It will be appreciated that various adjustments and refinements may be made to obtain the exact motion desired of the turning sticks and holding arms and that these adjustments and refinements may be accomplished by suitably altering the cams involved.

Figure 2:
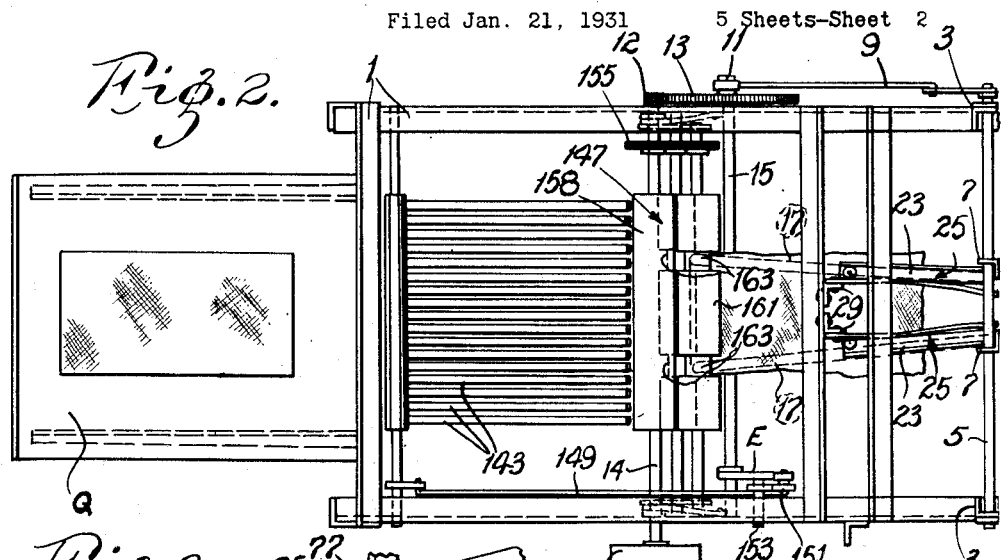
Fig. 2 is a plan view showing the delivery end thereof.

In Fig. 2 is shown the bag on the end of the turning sticks 17 and said sticks 17 in their most forward position. The ends of the sticks are in the recesses 163 of the rolls 159, 161. The lower edge of the bag is gripped by these rolls and delivered in between rolls 158, 159 and out from the machine. The fly leaves or arms 143 are at this time in the dotted line position shown in Fig. 1 to receive the bag. As the bag comes over from the rolls, the fly arms 143 quickly rotate counterclockwise and deliver the bag to the stack 2. Air resistance holds the bag on the fly arms.

After the above operation, the parts withdraw into their original positions as shown in Fig. 1 and the cycle repeats itself thereafter. Throughout the cyclic action, the table board 165 is being gradually lifted step by step a distance equal to the thickness of one bag for every cycle of operation. Thus what, under old conditions were variables of operation, are kept constant and are at least in part responsible for the positive action of the present machine.

*Advantages*

Among the advantages of the invention are the following: The fingers 51 with their needle 59 are positive in operation. Any mere roughening of the lower faces of the fingers 51 might cause a movement of the cloth to form a wrinkle such as 65, but to make the face effective to do this would require a greater downward pressure and therefore cause a tendency to move the next under cloth by friction. The slightest movement of the under cloth is undesirable and fatal to proper operation.

The needle 59 in each finger 51 has an optimum applicable weight for making it of maximum effectiveness. This optimum weight is put into the finger 51. It will be seen that the function of the needle 59 in puncturing the cloth is not occasioned by any change in weight of the arm 45 or force thereon and which may be designed to suit the required strength of the machine. The weight of each finger 51 is all that is causing puncturing of the cloth by the respective needle 59. It has been found that one needle 59 for each finger 51 gives the best results, two fingers being shown herein.

Another advantage of the invention is that the arm 45 with the fingers 51 is always striking the top of the stack P at the same angular position, this being true because of the upward feeding action of the pile of bags as they are used up in the turning process. Thus the fingers 51 and the needles 59 may be given an optimum design and this will be effective throughout the entire operation in disposing of the pile of bags.

Another advantage is that the lower holding arms 83 spread out along the lower straight edge of the bag and when they come to the seams or sideward creases, definitely stretch out any cuffs that have been formed by the pick-up means (see dotted line Fig. 5). They are also only in spring tension against the stretched bag, so that when the bag is stripped these arms 43 may give.

The tangential arrangement of the upper stack surface with respect to the curved sticks is also of advantage in providing an optimum arrangement of parts.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. Bag turning apparatus comprising a member adapted to move to and from the surface of a stack of bags upon which it is to operate, a linkage causing said movement, means associated with the member adapted to move the upper layer of material in said stack, said last-named means comprising an element having a normal force against said stack which is independent of force causing movement of said linkage and at least one point on said member adapted to pierce said upper layer of material.

2. Bag turning apparatus comprising a member adapted to move to and from the surface of a stack of bags upon which it is to operate, a linkage causing said movement, means associated with said member adapted to move the upper layer of material in said stack, said last-named means comprising an element having a normal force against said stack which is independent of force causing movement of said linkage and at least one needle like point in said member the apex of which projects a normal distance into said upper layer which is less than the thickness of said layer.

3. Bag turning apparatus comprising a member adapted to move to and from the surface of a stack of bags upon which it is to operate, a linkage causing said movement, means associated with said member adapted to move the upper layer of material in said stack, said last named means comprising an element having a normal force against said stack which is independent of force causing movement of said linkage and at least one needle point in said member the apex of which projects a normal distance into said upper layer which is less than the thickness of said layer and means adapted to move said element in a direction to wrinkle said layer into position to be gripped between said element and said member.

4. Bag turning apparatus comprising a member adapted to move to and from the surface of a stack of bags upon which it is to operate, a linkage causing said movement, means associated with said member adapted to move the upper layer of material in said stack, said last named means comprising an element having a normal force against said stack which is independent of force causing movement of said linkage and at least one needle point in said member the apex of which projects a normal distance into said upper layer which is less than the thickness of said layer and means adapted to move said element in a direction to wrinkle said layer into position to be gripped between said element and said member, said point being tilted in the direction of movement of said element.

5. Bag turning apparatus comprising a member adapted to move to and from the surface of a stack of bags upon which it is to operate, a linkage causing said movement, means associated with said member adapted to move the upper layer of material in said stack, said last named means comprising an element having a normal force against said stack which is independent of force causing movement of said linkage and at least one needle point in said member, the apex of which projects a normal distance into said stack less than the thickness of said layer and means whereby the member is driven from said linkage and said element is driven against the member to clamp a wrinkle thus gathered in said layer.

6. In a bag turning apparatus, means for holding a stack of bags, means for picking up only the uppermost layer of the uppermost bag, means for inserting holding arms therein, means adapted to subsequently spread said arms and means for forcing the base of the bag through its mouth comprising an arcuate set of turning sticks, said stack being substantially tangent to said turning sticks and means for spreading the turning sticks as they turn a bag.

7. In bag turning apparatus, means adapted to move to and from the surface of the stack of bags upon which it is to operate, a linkage for operating said means, a bell crank interposed between said linkage and said means, said bell crank having a portion having a component of movement substantially longitudinal of said movable means and fingers driven from said portion of the bell crank, said fingers having a lost-motion engagement with said means.

8. In bag turning apparatus, means adapted to move to and from the surface of the stack of bags upon which it is to operate, a linkage for operating said means, a bell crank interposed between said linkage and said means, said bell crank having a portion having a component of movement substantially longitudinal of said movable means and fingers driven from said portion of the bell crank, said fingers having a lost-motion engagement with said means both vertically and longitudinally.

9. In bag turning apparatus, a movable arm adapted to engage the upper surface of a stack of bags upon which it is to operate, a member oscillatory on said arm, a second member pivoted to said oscillatory member and having a contact face so mounted that it will normally effect contact with the surface of the stack of bags as said arm forms contact with the bags in its movement towards the bag surface and assume pivotal movement on the oscillatory member.

10. In bag turning apparatus, a movable arm adapted to engage the upper surface of a stack of bags upon which it is to operate, a member oscillatory on said arm, a second member pivoted to said oscillatory member and having a contact face so mounted that it will normally effect contact with the surface of the stack of bags as said arm forms contact with the bags in its movement towards the bag surface and assume pivotal movement on the oscillatory member and driving means attached to said oscillatory member whereby the arm and second pivoted member are both moved and means for limiting the movement of the pivoted member with respect to the arm.

11. In bag turning apparatus, a movable arm adapted to engage the upper surface of a stack of bags upon which it is to operate, a member oscillatory on said arm, a second member pivoted to said oscillatory member and having a contact face so mounted that it will normally effect contact with the surface of the stack of bags as said arm forms contact with the bags in its movement towards the bag surface and assume pivotal movement on the oscillatory member, the contact face of said second member having relative vertical and longitudinal movement with respect to said arm.

12. In apparatus of the class described raising and lowering means for a table, means for delivering the table above said raising and lowering means and means automatically movable under the table after the same has been raised adapted to tilt the same for delivery from the apparatus when the table lowers.

13. In bag turning apparatus, means adapted to move to and from the surface of the stack of bags upon which it is to operate, a linkage for operating said means, a bell crank interposed between said linkage and said means, said bell crank having a portion having a component of movement substantially longitudinal of said movable means and fingers driven from said portion of the bell crank, said fingers having a lost-motion engagement with said means and oscillating on said bell crank.

14. Bag turning apparatus comprising automatic means adapted to remove bags from a stack and successively turn them, said means including parts predeterminately positioned for proper operation at the removal event, an adjustable table for supporting said stack such that the uppermost bag is in proper position for said removal event and means positively mechanically connecting said bag removing means and said table during at least an interval of the motion of said bag removing means, whereby the table is continually and automatically adjusted to present a bag at optimum position for coordination with said bag removing means when said removing means is in said predetermined position.

15. Bag turning apparatus comprising means for automatically lifting bags from a stack and subsequently turning them, means for automatically predetermining the position of such stack, such that the topmost bag thereon is always in proper position when said automatic lifting means is operable to take said bag, and means causing said stack positioning means to operate step-by-step in one direction only.

16. In bag turning apparatus, a main frame, an oscillating shaft mounted therein, carrying means on said shaft, a plurality of turning arms laterally swingable on said carrying means, said arms being substantially curved on a radius referred to said shaft, a plurality of cams supported by said frame and means associated with said arms adapted to be guided by said cams to control the lateral swings of said arms as they oscillate with said shaft.

17. In bag turning apparatus, pick-up means comprising a member having a surface adapted to contact with the uppermost layer of a stack of bags, at least one point extending from said surface a normal distance less than the thickness of said layer, said point comprising a separate needle placed as an insert in the material forming said surface.

18. In automatic bag turning apparatus, a frame, a removable tray for a stack of bags, supporting means attached to the frame upon which the tray may be positioned for loading, means whereby the loaded tray may be slid into the apparatus, means for manually positioning the tray for subsequent automatic turning operations and means for automatically lifting said tray step-by-step as said automatic turning operations proceed.

19. In automatic bag turning apparatus, a frame, a removable tray for a stack of bags, supporting means attached to the frame upon which the tray may be positioned for loading, means whereby the loaded tray may be slid into the apparatus, means for manually positioning the tray for subsequent automatic turning operations, means for automatically lifting said tray step-by-step as said automatic turning operations proceed, means for depressing the tray, and means for automatically driving the same from the machine upon said depression.

20. Bag turning apparatus comprising means for automatically lifting bags from a stack and subsequently turning them, means positively, mechanically connecting with said means during at least an interval of the motion of said means, for automatically predetermining the position of the stack such that the top bag thereon is positively in proper position when said automatic lifting means is operable to take said bag.

In testimony whereof, I have signed my name to this specification this 19th day of January, 1931.

CHARLES F. SPARKS.